United States Patent
Benettolo

(10) Patent No.: US 12,163,615 B2
(45) Date of Patent: Dec. 10, 2024

(54) MODULAR FITTING FOR EXPANSION VESSELS

(71) Applicant: Zilmet SpA, Limena (IT)

(72) Inventor: Riccardo Benettolo, Limena (IT)

(*) Notice: Subject to any disclaimer, the term of this patent is extended or adjusted under 35 U.S.C. 154(b) by 0 days.

(21) Appl. No.: 17/599,503

(22) PCT Filed: Feb. 12, 2020

(86) PCT No.: PCT/IB2020/051113
§ 371 (c)(1),
(2) Date: Sep. 28, 2021

(87) PCT Pub. No.: WO2020/194073
PCT Pub. Date: Oct. 1, 2020

(65) Prior Publication Data
US 2022/0146032 A1    May 12, 2022

(30) Foreign Application Priority Data
Mar. 25, 2019  (IT) .................. 102019000004297

(51) Int. Cl.
*F16L 41/08*    (2006.01)
(52) U.S. Cl.
CPC .................. *F16L 41/082* (2013.01)
(58) Field of Classification Search
CPC .................................... F16L 41/082

USPC ............................ 285/139.1–139.3
See application file for complete search history.

(56) References Cited

U.S. PATENT DOCUMENTS

| 2,475,007 | A |   | 7/1949  | Carlson |
| 4,224,464 | A |   | 9/1980  | Bunnell |
| 4,676,533 | A |   | 6/1987  | Gerondale |
| 7,597,361 | B2 | * | 10/2009 | Theilen ................ A01G 25/092 |
|           |    |   |         | 285/139.2 |
| 2003/0178843 | A1 | * | 9/2003 | McAliley ................ F16L 41/14 |
|           |    |   |         | 285/114 |
| 2008/0290658 | A1 | * | 11/2008 | Kimura .................... F16L 23/10 |
|           |    |   |         | 285/364 |
| 2015/0076159 | A1 | * | 3/2015 | Lai ........................... F17C 1/00 |
|           |    |   |         | 220/581 |

FOREIGN PATENT DOCUMENTS

| EP | 0747622 | 12/1996 |
| EP | 1376044 | 1/2004 |

* cited by examiner

*Primary Examiner* — James M Hewitt, II
(74) *Attorney, Agent, or Firm* — Themis Law

(57) ABSTRACT

A pipe fitting for expansion tanks includes a first part suited to be fixed to an expansion tank during production of the expansion tank, and a second part suited to be fixed to the first part, if necessary, even at a later moment than the production of the expansion tank.

5 Claims, 5 Drawing Sheets

MODULAR FITTING FOR EXPANSION VESSELS

The present patent relates to expansion tanks and in particular concerns a new improved fitting for expansion tanks.

Expansion tanks are a hydraulic component, commonly found in boilers for civil and industrial heating purposes, in particular in heating systems and domestic hot water systems, which have the task of compensating for the volume changes resulting from temperature variations in the fluid circuit preventing dangerous increases of pressure in the circuit, which would otherwise affect the pipes and other components of the system.

Expansion tanks are also commonly present in pumping systems and lifting systems where they store fluid from the circuit and return it back to the circuit itself when needed.

Expansion tanks also have the function of protecting systems from sudden changes in pressure due to instantaneous interruptions in the flow resulting in the generation and propagation of water hammers.

Expansion tanks comprising two rigid half-shells, usually made of metal material, positioned opposite each other and joined together to form a closed casing are known in the prior art. Inside the tank there is a membrane that divides the internal space into two compartments which respectively contain the compressible gas to compensate for the change in volume of the fluid of the system and the incompressible fluid subjected to changes in volume.

The half-shell which contains the system fluid has a fitting, communicating with the inner compartment, to connect the compartment to the hydraulic system.

In contrast, the other of the two half-shells has a valve port with a preload valve for the regulation of the gas pressure.

Said half-shells of the expansion tanks of the known type are generally made of metal material, typically of steel or other materials possibly coated internally with polymeric materials or equipped with an internal half-shell made of thermoformed material.

Said fitting is generally made of an axially perforated cylindrical body where the diameter of the axial hole determines the useful diameter of the liquid passageway.

Said cylindrical body comprises a first end suited to be constrained to the relative half-shell in correspondence with a hole made on the half-shell itself.

For example, said first end comprises an annular part which is in any case constrained internally to the half-shell, typically by riveting and/or welding.

Said cylindrical body comprises a second end, opposite said first end, suited to be connected with a duct of the hydraulic system.

For example, said second end is threaded to be screwed to a conduit or a further threaded element for the connection with the duct.

Alternatively said second end is specially shaped to be connected to a duct or to a further element for the connection with the duct.

The conformation and dimensions of said second end depend on the type of duct to be connected or the type of fitting element used.

The production of the expansion tank is therefore necessarily different according to the type of hydraulic system in which it will be installed. Consequently, the number of pieces to be produced is a function of the demand, thus impairing the optimal production of expansion tanks.

The object of this patent is a new modular fitting for expansion tanks.

One object of the new fitting is to allow at least the partial assembly of each expansion tank regardless of the final type of fitting required.

Another object of the new fitting is to allow the application of the required final fitting to an expansion tank with minimal intervention.

These and other aims, direct and complementary, are achieved by the new modular fitting for expansion tanks comprising a first part joined and fixed to the half-shell of the expansion tank and a variably shaped second part joined to said first part.

The new fitting for expansion tanks therefore comprises at least two parts made of metal material which are distinct, complementary, and can be fixed to each other.

The first part of the new fitting consists of a tubular element having the edge of one end bent orthogonally outwards to form a contact ring.

The tubular portion of said first part is suited to be inserted and housed in the hole of a half-shell of the expansion tank, while the contact ring portion is suited to rest on and be joined to the external surface of said half-shell of the expansion tank.

In particular, the annular surface of said contact ring facing the tubular portion has an annular projection preferably concentric to said tubular portion and to said contact ring.

It is preferable that said annular projection has a triangular, trapezoidal or in any case tapered section in the opposite direction from said contact ring and therefore suitable for electric projection welding.

The second part of the new fitting consists of a tubular element having the edge of one end bent orthogonally outwards or inwards so as to form a contact and connection ring.

The contact and connection ring portion of said second part is suited to rest on and be joined to the surface of the contact ring of said first part, the tubular portion of said second part is suited to be connected with a duct of the hydraulic system.

In particular, the annular surface of said contact ring facing away from the tubular portion has an annular projection preferably concentric to said tubular portion and to said contact and connection ring.

It is preferable that said annular projection has a triangular, trapezoidal or in any case tapered section in the opposite direction from said contact and connection ring.

The tubular portion of said second part is preferably threaded, or it can be equipped with a flange at the end opposite said contact and connection ring, or it can have another type or shape of connection to a hydraulic system duct.

Both the annular projection of the first part and the annular projection of the second part of the new fitting for expansion tanks are suited to be joined by electric projection welding, respectively the first part to the metal half-shell of the expansion tank and the second part to the contact ring of the first part.

In this way, a complete fitting fixed to the expansion tank is obtained.

The characteristics of the modular fitting for expansion tanks will be better explained by the following description with reference to the drawings attached by way of a non-limiting example.

The attached drawings show, by way of a non-limiting example, a practical embodiment of the invention.

FIG. 1 shows the first part (A) of the new modular fitting for expansion tanks.

The first part (A) of the new fitting consists of a tubular portion (A1) having the edge of one end bent orthogonally to form a contact ring (A2).

The tubular portion (A1) of said first part (A) is suited to be inserted and housed in the hole (Va1, Vb1) of a half-shell (Va, Vb) of the expansion tank (V).

The contact ring portion (A2) of said first part (A) is suited to rest on and be joined to the external surface (Ve) of said half-shell (Va, Vb) of the expansion tank (V).

The end (A1.1) of the tubular portion (A1) opposite said contact ring portion (A2) is suited to be folded towards the contact ring portion (A2) so as to fix said first part (A) of the new fitting to the edge of the hole (Va1, Vb1) of the expansion tank (V).

On the annular surface (A2.1) of said contact ring (A2) facing the tubular portion (A1) there is an annular projection (A3) concentric to said tubular portion (A1) and to said contact ring (A2).

Said annular projection (A3) has a trapezoidal section tapered in the direction opposite said contact ring (A2).

This annular projection (A3) is the contact surface between the first part (A1) and the cap of the expansion tank (V) during the electric projection welding of said first part (A1) and said cap of the expansion tank (V).

Figure 1:
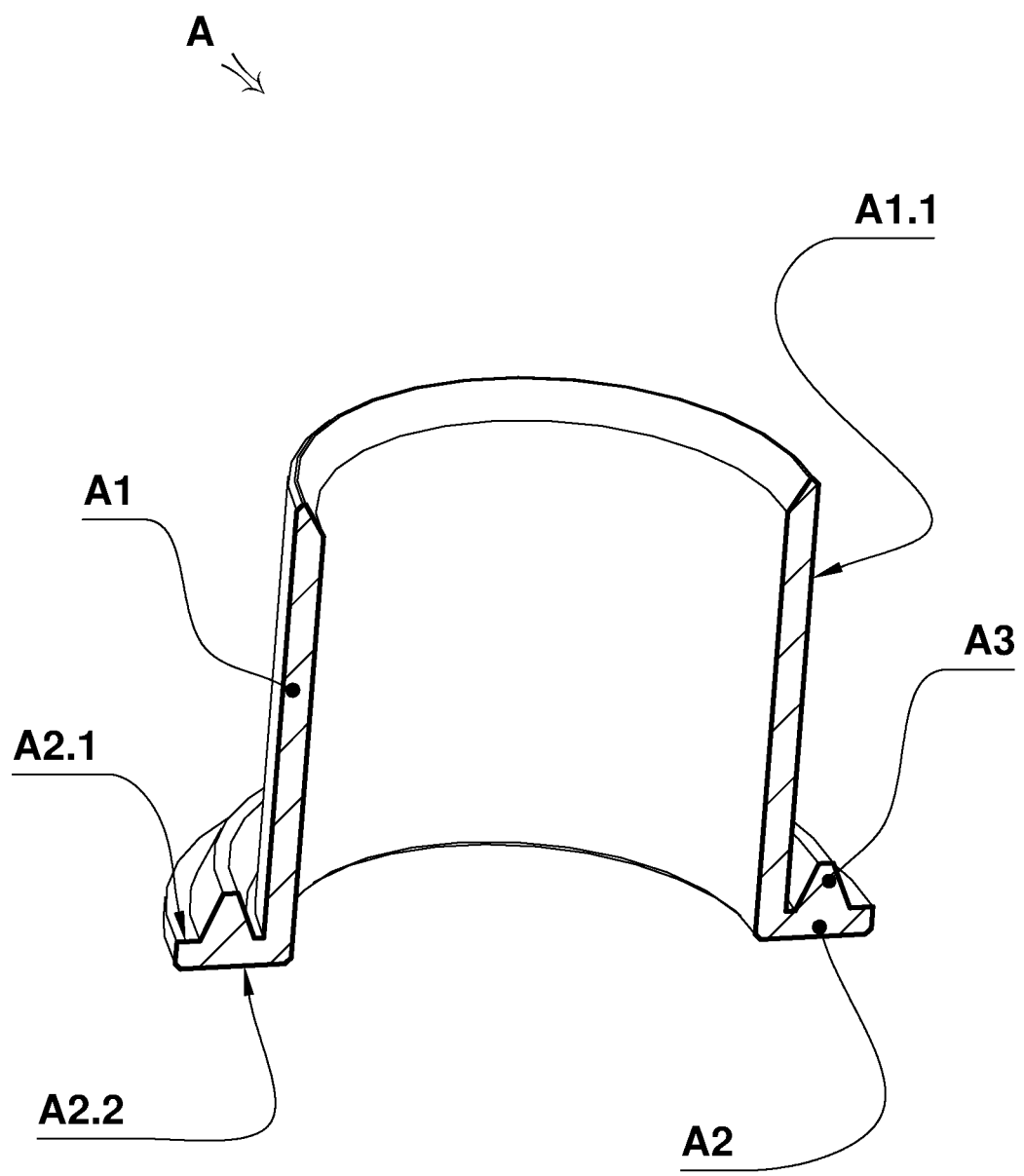
FIG. 1 illustrates the first part of a modular fitting for expansion tanks according to the invention.
Figure 2:
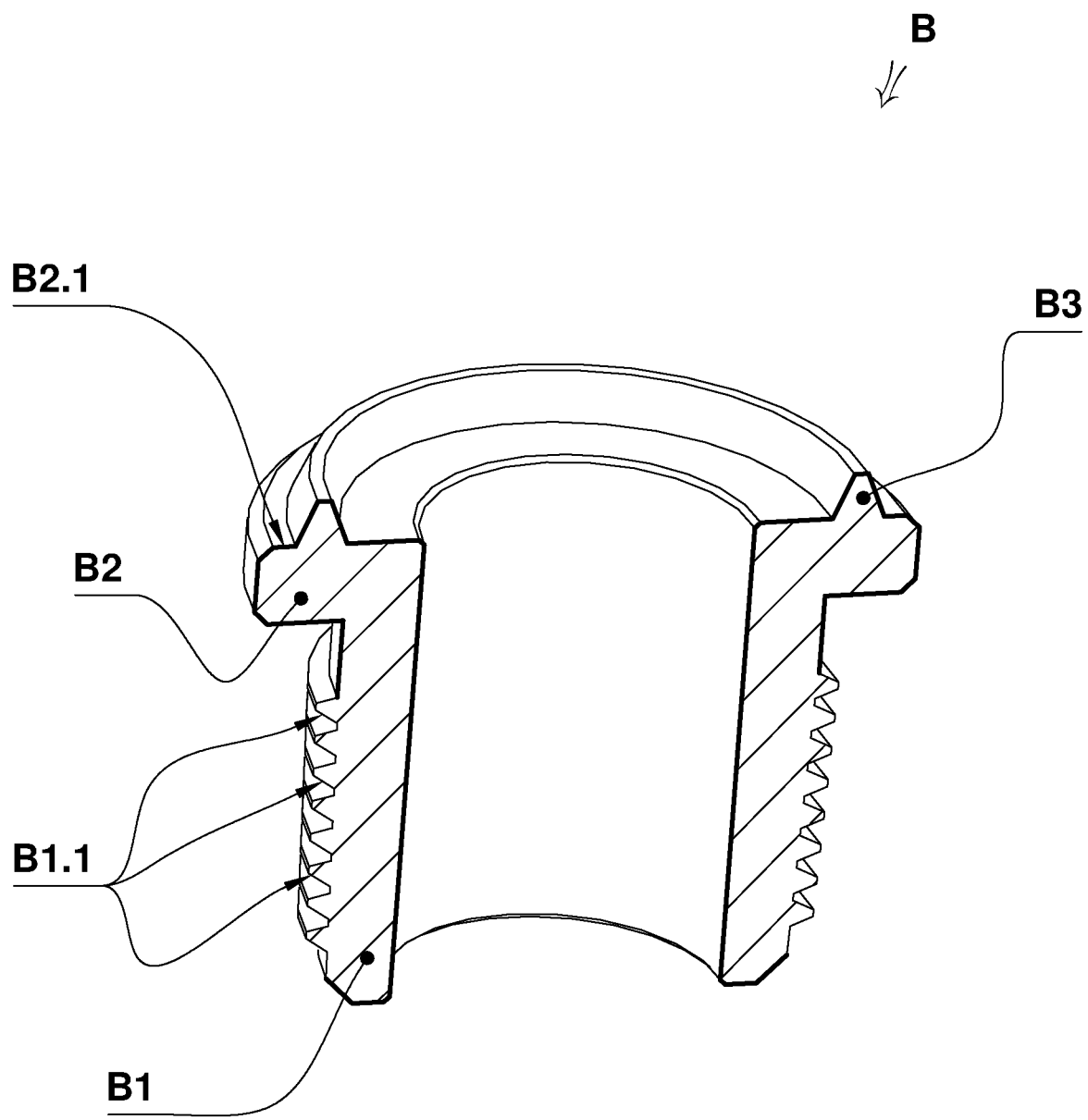
FIG. 2 illustrates the second part of a modular fitting for expansion tanks according to the invention.

FIG. 2 shows the second part (B) of the new modular fitting for expansion tanks.

The second part (B) of the new fitting consists of a tubular portion (B1) having the edge of one end bent orthogonally to create a contact and connection ring (B2).

The contact and connection ring portion (B2) of said second part (B) is suited to rest on and be joined to the surface (A2.2) of the contact ring (A2) of said first part (A).

The annular surface (B2.1) of said contact and connection ring (B2) facing away from the tubular portion (B1) has an annular projection (B3) concentric to said tubular portion (B1) and to said contact and connection ring (B2).

In this embodiment, said annular projection (B3) has a trapezoidal section tapered in the direction opposite said contact and connection ring (B2).

The tubular portion (B1) of said second part (B) is suited to be connected to a duct of the hydraulic system.

Figure 5:
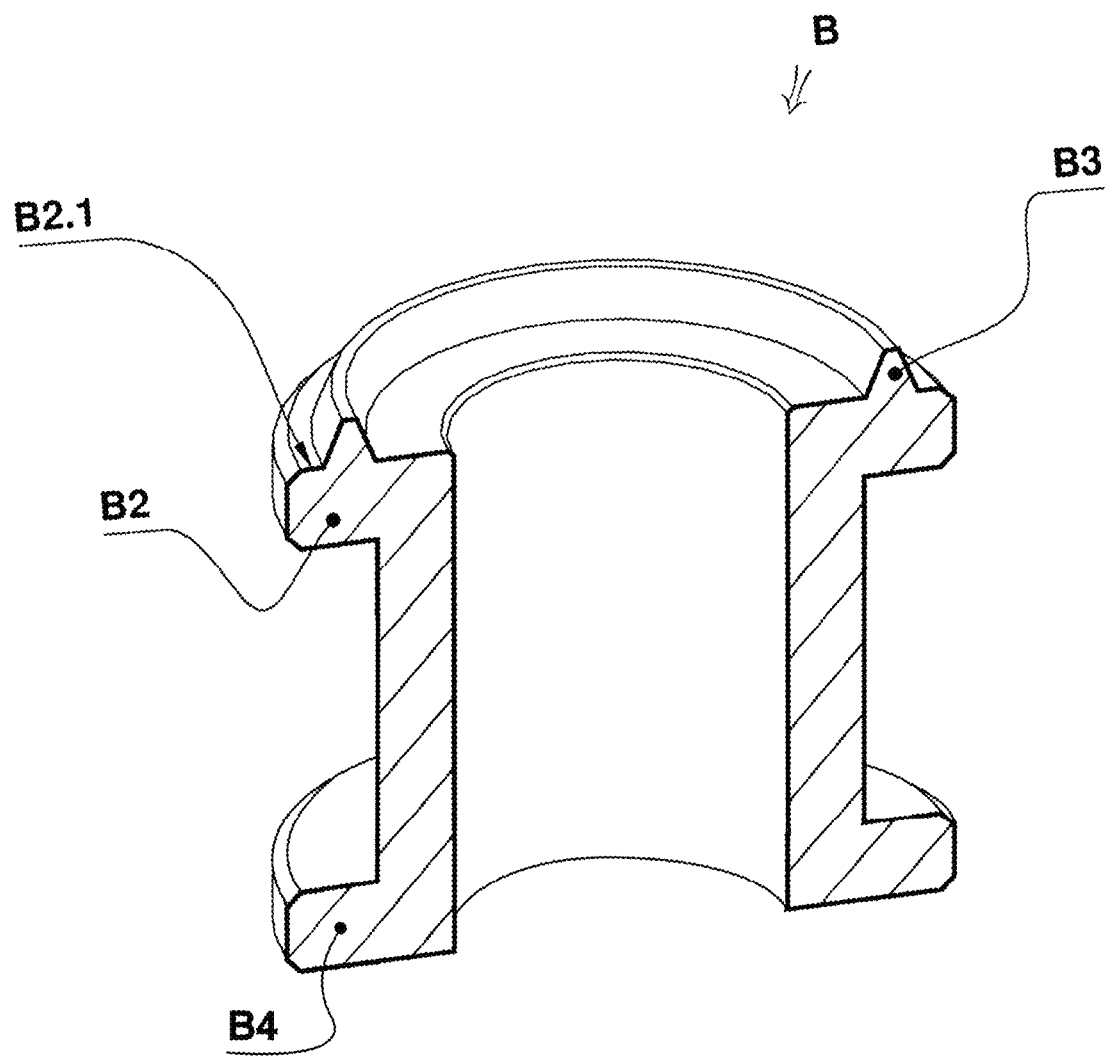
FIG. 5 illustrates an embodiment of the second part of a modular fitting for expansion tanks according to the invention, which includes a flange.

In this embodiment the external surface of the tubular portion (B1) of said second part (B) is threaded (B1.1), but it can be equipped with a flange (B4) at its end opposite said contact and connection ring (B2), as shown in FIG. 5, or it can have another type or shape of connection to a hydraulic system duct.

Figure 3:
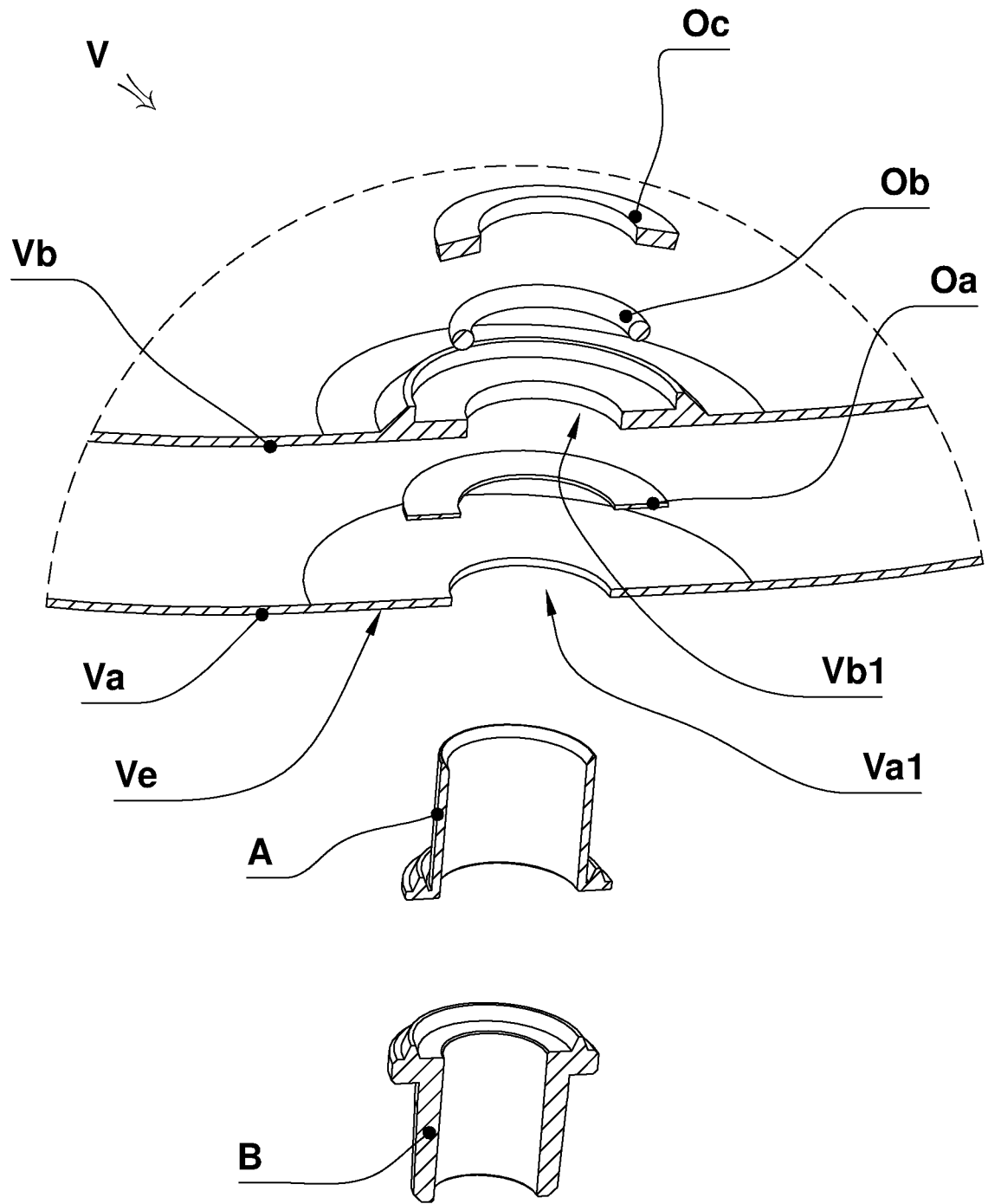
FIGS. 3 and 4 illustrate a modular fitting for expansion tanks according to the invention, in exploded and assembled views, joined to an expansion tank.
Figure 4:
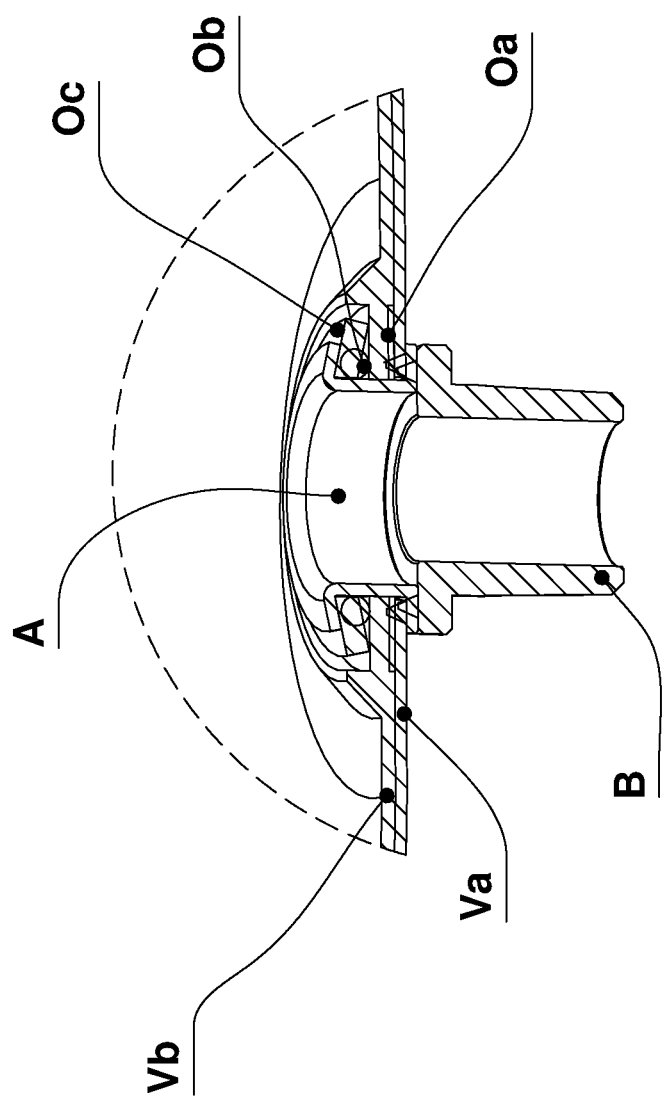

FIGS. 3 and 4 show two points in the assembly of the new modular fitting (A, B) to a half-shell (Va, Vb) of an expansion tank (V).

In FIG. 3, in particular, the various parts are shown separated while in FIG. 4 the various parts are shown joined.

In this embodiment, the half-shell (Va, Vb) of the expansion tank (V) comprises the external cap (Va) made of metal material and an internal cap (Vb) made of a material suitable to prevent corrosion and for contact with sanitary fluids and/or liquid foodstuffs.

Initially the first part (A) of the new fitting is coupled and joined to the outer cap (Va) by inserting its tubular portion (A1) into the hole (Va1) of the outer shell (Va) and joining said first part (A) to the outer shell (Va) by electric projection welding.

This welding fuses the annular projection (A3) of the first part (A) which joins the contact ring (A2) of the first part to the external surface of the outer cap (Va).

Subsequently, a gasket (Oa), the inner cap (Vb), a sealing gasket (Ob) and a riveting ring (Oc) are coupled on said tubular portion (A1) of the first part (A).

A pressure plastic deformation, typically riveting, deforms the end (A1.1) of said tubular portion (A1) holding the element (Oa), the inner cap (Vb), the seal (Ob), and the riveting ring (Oc) ensuring a watertight seal.

In this phase, the new fitting has only the first part (A) joined to the expansion tank, with the outer ring surface (A2.2) ready to receive a second part (B) of the new fitting.

At this point the semi-finished expansion tank (V) is stored together with other identical semi-finished expansion tanks (V).

When expansion tanks (V) with specific connections are required, the semi-finished expansion tanks (V) are picked and appropriate second parts (B) of the new fitting specific for the type of connection are applied to them.

Each second part (B) of the new fitting is joined to the annular flat surface (A2.2) of the first part (A) already fixed to the expansion tank (V).

In particular said second part (B) is coupled to the first part (A) so that its contact and connection ring (B2) faces the contact ring (A2) of the first part (A).

The first (A) and second part (B) of the new fitting are joined by means of electric projection welding.

FIG. 4 shows the final phase of the two parts (A, B) of the new fitting joined to an expansion tank (V).

The new modular fitting made as described above has considerable advantages.

The new fitting (A, B) enables the partial assembly of each expansion tank (V) regardless of the type of final fitting (A, B) required.

The new fitting (A, B) allows each expansion tank (V) to be assembled completely and to add the second part (B) of the fitting (A, B) at a later time.

The new fitting (A, B) allows the second part (B), suited to the specific type of connection, to be added to each expansion tank (V) previously assembled with the first part (A) of the fitting (A, B).

The use of the new fitting (A, B) enables less space to be occupied in the warehouse as it is sufficient to stock expansion tanks (V) with various capacities to which the second necessary specific parts (B) are applied.

The use of the new fitting (A, B) enables the production of specific expansion tanks (V) even in small quantities.

Therefore, with reference to the preceding description and the attached drawings the following claims are made.

The invention claimed is:

1. A pipe fitting for expansion tanks, comprising:
a first part configured to be fixed to an expansion tank during production of said expansion tank; and
a second part configured to be fixed to said first part,
wherein said first part comprises a tubular portion defined by an outer face and an inner face of a tube and adapted to be inserted and housed in a hole provided in one of two half shells that make up the expansion tank, and further comprises a portion shaped as a contact ring that extends radially outwardly from a longitudinal end of said tubular portion and is configured to be rested on and joined to a surface of said expansion tank, wherein said first part further comprises an annular projection that extends longitudinally from an upper annular radial surface of said contact ring of said first part facing toward the tubular portion of said first part, said longitudinally extending annular projection providing a contact surface between said contact ring of said first part and a cap of the expansion tank during projection welding between said first part and said cap of the expansion tank, wherein said second part comprises a contact and connection ring that extends radially outwardly and is configured to be fixed to a lower annular radial surface of said contact ring of said first part, and further comprises a tubular portion configured to be connected to a duct of a hydraulic system and facing an opposite direction with respect to said first part and to said expansion tank, and wherein said second part comprises an annular projection that extends longitudinally from an annular surface of said contact and connection ring of said second part opposite the tubular portion of said second part, said annular projection of said second part providing a contact surface between said contact and connection ring of said second part and said lower annular radial surface of said contact ring of said first part.

2. The pipe fitting according to claim 1, wherein said first part and said second part are configured to be joined to each other with the contact ring of the first part adhering to and concentric with the contact and connection ring of the second part through a perimeter weld.

3. The pipe fitting according to claim 1, wherein an external surface of the tubular portion of said second part is threaded, so that said second part can be connected to a duct of the hydraulic system.

4. The pipe fitting according to claim 1, wherein an external surface of the tubular portion of said second part is conical, so that said second part can be connected to a duct of the hydraulic system.

5. The pipe fitting according to claim 1, wherein an edge of said tubular portion of said second part opposite said contact and connection ring comprises a flange for connection to a duct of the hydraulic system.

\* \* \* \* \*